UNITED STATES PATENT OFFICE 2,370,903

PRODUCTS FOR PHARMACEUTICAL USE AND IMPROVEMENTS IN A METHOD FOR PREPARING THESE PRODUCTS

Heinrich Hirschmann, Zofingen, Aargau, Switzerland, assignor to Aktiengesellschaft vormals B. Siegfried, Zofingen, Aargau, Switzerland No Drawing. Application October 13, 1941, Serial No. 414,888. In Switzerland October 28, 1940

2 Claims. (Cl. 260—500)

The preparation of organic phosphonous acids by reacting hypophosphorous acid with aldehydes is well known. But all working prescriptions known hitherto stipulate that in order to obtain satisfying yields and to avoid the formation of undesired by-products, the hypophosphorous acid must be used in a considerable excess. Besides this uneconomical excess of the acid one had further to work in a fairly high dilution and at temperatures of at least 90–95° C. The isolation of the pure phosphonous acids or of their salts was very complicated and expensive due to the fact that as intermediate products the difficultly soluble heavy metal salts had to be prepared which latter had to be decomposed by means of hydrogen sulphide.

The reaction takes place according to the following formula:

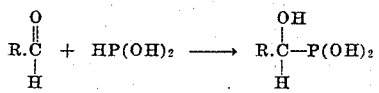

As the hypophosphorous acid can also be represented by the formula

the products may have the formula

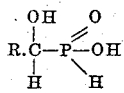

but it is believed that the first one is more probable and is therefore used in this application.

It has now be found that the preparation of organic phosphonous acids can be executed according to the above mentioned formulae with practical quantitative yields without use of an excess of hypophosphorous acid, when working in a concentrated solution but only at a temperature of maximal 60° C., preferably between 50 and 60° C. The purification of the products obtained in this manner is considerably simplified due to the fact that the organic phosphonous acids are obtained directly in a practically pure state.

The organic phosphonous acids obtained with the new process may be employed for many purposes for instance as intermediate products or as pharmaceutical products. So for example the α-hydroxybenzyl-phosphonous acid

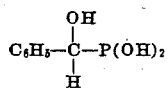

or its salts may be used as a pharmaceutical product, a number of physiological tests having shown that this compound possesses the valuable properties of a strongly acting tonic. Tests on surviving animal organs showed for example that the heart of a frog which in Ringer's solution showed a continually decreasing number of pulsations and a decreasing intensity on addition of a very diluted solution of the sodium salt of the α-oxybenzyl-phosphonous acid showed for each case an interruption of the decrease. Much more instructive is the effect on the peristaltic movement of recently killed white mice which have been brought with opened abdomen in a Ringer's solution of 36° C. which was continuously passed by a current of oxygen gas. The peristaltic movement which diminished after some hours, after addition of some ccm. of a 2–4% solution of the sodium salt of α-oxybenzyl-phosphonous acid, restored very distinctly his activity.

Physiological tests on rats with avitaminose-$B_1$ showed that the simultaneous dispensation of the sodium salt of the α-oxybenzyl-phosphonous acid gave a remarkable increased effect of the vitamin-$B_1$. Clinical tests showed a very favorable influence of the α-oxybenzyl phosphonous acid on the lassitude caused by insuline shock, and an improvement of the general disposition, as well as an enhanced improvement of physical efforts.

Whereas the α-oxybenzyl-phosphonous acid is a known substance, but new as a pharmaceutical product, the other organic phosphonous acids are entirely new compounds.

The invention shall be explained in a more detailed manner in the following examples wherein the parts are parts by weight:

Example 1

40.2 parts of isophthalic aldehyde are mixed with 48 parts of an 82% hypophosphorous acid at ordinary temperature and reacted while stirring at a temperature of 50–55° C. After cooling, the mixture is dissolved in water and neutralised with sodium carbonate. After filtering the solution of the sodium salt it is concentrated by evaporation under sub-atmospheric pressure, to obtain the sodium salt of the meta xylyl dialpha hydroxyphosphonous acid as a white crystalline substance which is readily soluble in water.

Example 2

32 parts of oxymethylene camphor are reacted during several hours with 32 parts of an 82% hypophosphorous acid at a temperature of 50–55° C. The mixture is then treated as described in Example 1 and the sodium salt of the hydroxycamphor phosphonous acid is obtained as a white crystalline substance which is fairly soluble in ethyl-alcohol, more difficultly soluble in water.

Example 3

1 gramme-molecule of oenanthic aldehyde and 1 gramme-molecule of hypophosphorous acid are reacted together as indicated in Example 1 and the plumbate of the hydroxy-oenanthylic-phosphonous acid is precipitated by addition of neutral lead acetate. The precipitate is filtered, washed with water and decomposed by means of hydrogen-sulphide. The sulphide of lead is filtered and the filtrate concentrated on the water bath till the hydroxy-oenanthylic-phosphonous acid crystallizes. The product has a melting point of 55-57° C. and is easily soluble in water, ethanol and ether, difficultly soluble in benzol and petroleum ether.

I claim:

1. As a new chemical compound the sodium salt of meta xylyl dialpha-hydroxyphosphonous acid.

2. The method of forming the sodium salt of meta xylyl-dialpha-hydroxyphosphonous acid as a water soluble crystalline substance suitable for pharmaceutical use comprising, mixing at room temperature about 40.2 parts of isophthalic aldehyde with about 48 parts of 82% hypophosphorous acid, reacting the mixture at a temperature of about 50° to 55° C., cooling the products, dissolving the products in water, neutralizing by adding sodium carbonate, filtering the solution, and concentrating the solution by evaporation under vacuum.

HEINRICH HIRSCHMANN.